(12) United States Patent
Nishio et al.

(10) Patent No.: US 11,597,327 B2
(45) Date of Patent: Mar. 7, 2023

(54) STORAGE COMPARTMENTS HAVING LID DAMPERS AND TRAY DAMPERS ON A COMMON AXIS, CONSOLE ASSEMBLIES, AND VEHICLES INCORPORATING THE SAME

(71) Applicant: Toyoda Gosei Co., Ltd., Kiyosu (JP)

(72) Inventors: Kazunari Nishio, Wixom, MI (US); Roy Thorsell, Wixom, MI (US); Jake McNamara, Livonia, MI (US)

(73) Assignee: Toyoda Gosei Co., Ltd., Kiyosu (JP)

( * ) Notice: Subject to any disclaimer, the term of this patent is extended or adjusted under 35 U.S.C. 154(b) by 135 days.

(21) Appl. No.: 17/137,827

(22) Filed: Dec. 30, 2020

(65) Prior Publication Data

US 2022/0203900 A1  Jun. 30, 2022

(51) Int. Cl.
*B60R 7/04* (2006.01)
(52) U.S. Cl.
CPC ..................... *B60R 7/04* (2013.01)
(58) Field of Classification Search
CPC ........................................................ B60R 7/04

USPC ............... 296/24.34, 37.8, 37.1, 1.07
See application file for complete search history.

(56) References Cited

U.S. PATENT DOCUMENTS

| 2005/0205370 A1* | 9/2005 | Kanno | F16F 9/12 |
| | | | 188/290 |
| 2019/0136592 A1* | 5/2019 | Muntean | E05B 85/06 |

FOREIGN PATENT DOCUMENTS

JP  2008-273292 A  11/2008

\* cited by examiner

*Primary Examiner* — D Glenn Dayoan
*Assistant Examiner* — E Turner Hicks
(74) *Attorney, Agent, or Firm* — Dinsmore & Shohl, LLP

(57) ABSTRACT

A storage compartment comprising a housing, a lid, a lid damper, a storage tray, and a tray damper. The lid damper pivotally couples the lid to the housing about a pivot axis such that the lid is moveable between an open position and closed position. The tray damper pivotally couples the storage tray to housing about the pivot axis such that the storage tray is moveable between a lowered position and a raised position independent of the lid.

20 Claims, 6 Drawing Sheets

STORAGE COMPARTMENTS HAVING LID DAMPERS AND TRAY DAMPERS ON A COMMON AXIS, CONSOLE ASSEMBLIES, AND VEHICLES INCORPORATING THE SAME

TECHNICAL FIELD

The present specification generally relates to storage compartments for console assemblies of vehicles and, more specifically, to storage compartments having lid dampers and tray dampers provided on a common axis.

BACKGROUND

It has been known to provide passenger compartments of vehicles with console assemblies having storage compartments that include both a lid and an internal tray that are pivotally supported by the storage compartment. However, the previously known storage compartments do not provide both the lids and the trays with dampers due to packaging constraints of the storage compartment. As such, the previously known lids and trays were prone to slam shut when left unsupported in an open position. Further, as the previously known lids and trays were freely pivotal a perceived quality felt by users was decreased to a lack of a perceived weight of the lid and the tray.

Accordingly, there is a need for storage compart assemblies, console assemblies, and vehicles that provide a lid and a tray of a storage compartment with dampers within the packaging constraints of the storage compartment and which increases a perceived quality felt by a user due to an increase in the perceived weight of the lid and the tray.

SUMMARY

In accordance with one embodiment, a storage compartment includes a housing, a lid, a lid damper, a storage tray, and a tray damper. The lid damper pivotally couples the lid to the housing about a pivot axis such that the lid is moveable between an open position and a closed position. The tray damper pivotally couples the storage tray to housing about the pivot axis such that when the lid is in the open position the storage tray is moveable between a lowered position and a raised position independent of the lid.

In accordance with another embodiment, a console assembly for a vehicle is provided. The console assembly includes a housing, a lid, a lid damper, a storage tray, and a tray damper. The lid damper pivotally couples the lid to the housing about a pivot axis such that the lid is moveable between an open position and a closed position. The tray damper pivotally couples the storage tray to housing about the pivot axis such that when the lid is in the open position the storage tray is moveable between a lowered position and a raised position independent of the lid.

In accordance with another embodiment, a vehicle is provided. The vehicle includes a passenger compartment and a storage compartment provided within the passenger compartment. The storage compartment includes a housing, a lid, a lid damper, a storage tray, and a tray damper. The lid damper pivotally couples the lid to the housing about a pivot axis such that the lid is moveable between an open position and a closed position. The tray damper pivotally couples the storage tray to housing about the pivot axis such that when the lid is in the open position the storage tray is moveable between a lowered position and a raised position independent of the lid.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Figure 1:
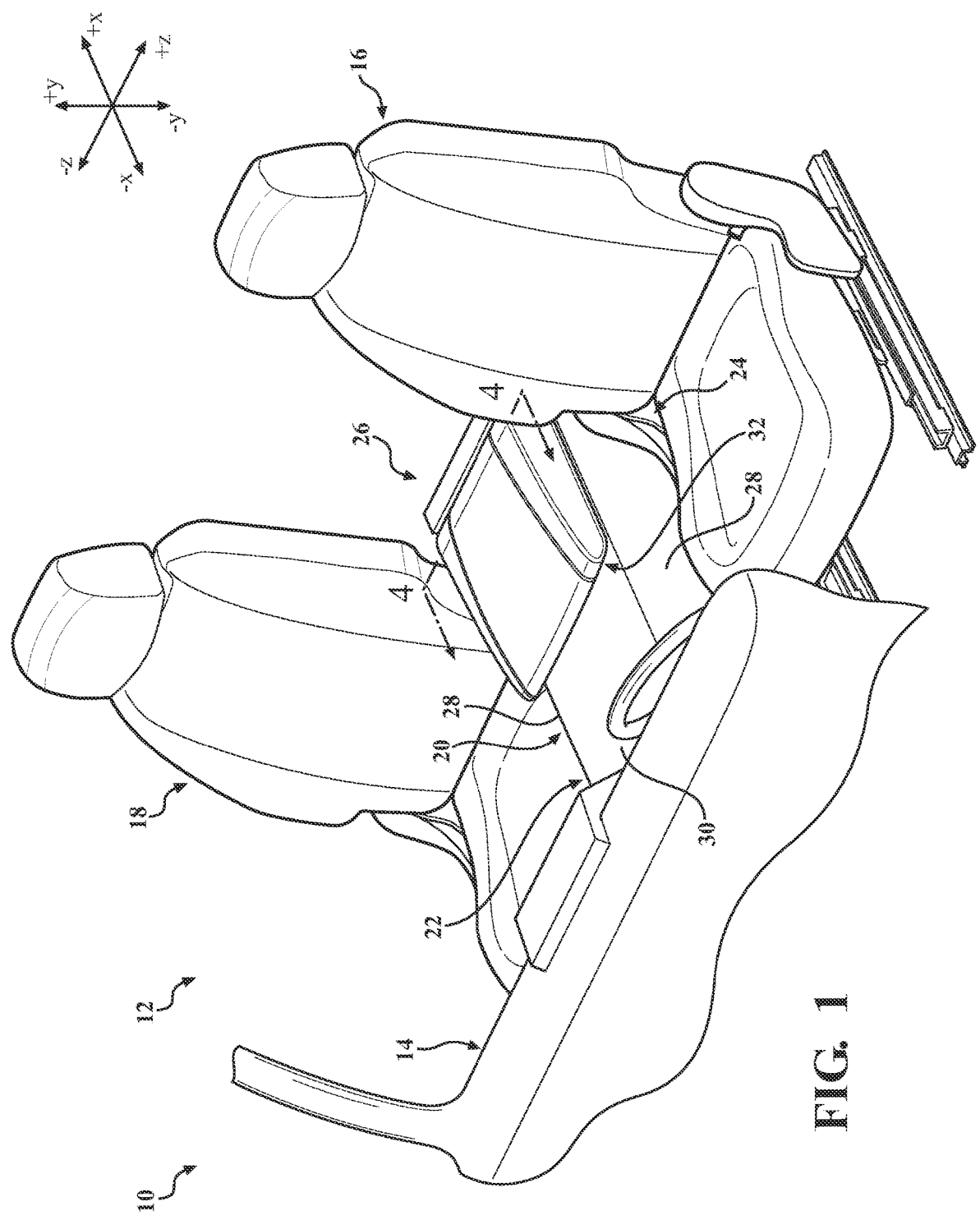
FIG. 1 schematically depicts a partial perspective view of a passenger compartment of a vehicle having a console assembly and a storage compartment in a closed state, according to one or more embodiments described and illustrated herein.

Vehicles according to the present specification include a passenger compartment having an instrument panel and at least two seats, such as a driver seat and a front passenger seat. Between the driver seat and the front passenger seat, and rearward of the instrument panel is a console assembly. The console assembly extends rearward from the instrument panel in a vehicle longitudinal direction. The console assembly may be mounted in-between the driver seat and the front passenger seat, and immediately rearward of the instrument panel so that a portion the console assembly may be incorporated with the instrument panel.

The console assembly includes a storage compartment. The storage compartment includes a housing, a lid, a lid damper, a storage tray, and a tray damper. The lid is pivotally coupled to the housing by the lid damper. The lid is pivotal about a pivot axis between an open position and a closed position. The tray is pivotally coupled to the housing by the damper. The storage tray is pivotal about the same pivot axis as the lid between a raised position and a lowered position. The lid is coupled to the housing such that the lid is pivotal about the common axis between the open position and the closed position independent of the tray. The tray is coupled to the housing such that when the lid is in the open position the tray is pivotal about the common axis between the raised position and the lowered position independent of the lid.

In order to provide an increase in perceived quality to a user the lid is pivotally coupled to the housing by the lid damper and the storage tray is pivotally coupled to the housing by the tray damper. The lid damper and the tray damper as provided so as to pivot about a common pivot axis to comply with the limited packaging constraints of the storage compartment. The lid damper and the tray damper at least partially counters or absorbs the movement of the lid and the tray, respectively.

The lid damper exerts a damping force against at least one of a movement of the lid from the closed position to the open position and a movement of the lid from the open positon to the closed position. The damping force against the movement of the lid from the closed positon to the open position provides an increase in a perceived weight of the lid thereby increasing the user's perceived quality of the lid. The damping force against the movement of the lid from the open positon to the closed position inhibits the lid from free falling from the open positon to the closed position. Specifically, the damping force against the movement of the lid from the open positon to the closed position provides anti-slamming feature such that upon movement of the lid from the open position to the closed position, the damping force inhibits a free fall of the lid from the open position to the closed position if the user releases the lid before reaching the closed position.

The tray damper exerts a damping force against at least one of a movement of the storage tray from the lowered position to the raised position and a movement of the storage tray from the raised positon to the lowered portion. The damping force against the movement of the storage tray from the lowered positon to the raised position provides an increase in a perceived weight of the storage thereby increasing the user's perceived quality of the storage tray. The damping force against the movement of the storage tray from the raised position to the lowered positon inhibits the storage tray from free falling from the raised position to the lowered positon. Specifically, the damping force against the movement of the storage tray from the raised positon to the lowered position provides anti-slamming feature such that upon movement of the storage tray from the raised position to the lowered position, the damping force inhibits a free fall of the storage tray from the raised position to the lowered position if the user releases the storage tray before reaching the lowered position.

The housing defines a storage space that is accessible when the lid is in the open position and the tray is in the raised position. When the lid is in the closed position, access to the storage space is inhibited. When the tray is in the lowered position access to the storage space is inhibited even when the lid is in the open position.

The tray includes a storage surface. The storage surface of the tray is access when the lid is in the open position and the tray is in the lowered position. When the lid is in the closed position, access to the storage surface of the tray is inhibited.

Various embodiments of the storage compartment of a console assembly for the vehicle will be described in more detail herein.

As used herein, the term "vehicle longitudinal direction" refers to the forward-rearward direction of the vehicle (i.e., in the +/− vehicle X-direction as depicted). The term "vehicle lateral direction" refers to the cross-vehicle direction of the vehicle (i.e., in the +/− vehicle Z-direction as depicted), and is transverse to the vehicle longitudinal direction. The term "vehicle vertical direction" refers to the upward-downward direction of the vehicle (i.e., in the +/− vehicle Y-direction as depicted). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about the vehicle centerline, the direction to which use of terms "inboard" or "outboard" and refer may be mirrored about the vehicle centerline when evaluating components positioned along opposite sides.

Referring initially to FIG. 1, a partial perspective view of a passenger compartment 12 of a vehicle 10 is depicted. An instrument panel 14 is provided within the passenger compartment 12. The passenger compartment 12 includes a driver seat 16 and a front passenger seat 18.

The instrument panel 14 generally extends in the vehicle lateral direction and includes, without limitation, an instrument cluster, a radio, and a climate control cluster including a plurality of individual vents. Located forward of the driver seat 16 are the vehicle driving controls such as, without limitation, a steering wheel, a gas pedal, and a brake pedal.

In some embodiments, the vehicle 10 is an autonomous vehicle in which no vehicle driving controls are provided. In such an embodiment, the passenger compartment 12 includes another front passenger seat 18 in place of the driver seat 16. It should be appreciated that the passenger compartment 12 may include a plurality of passenger seats rearward of the driver seat 16 and the front passenger seat 18 in the vehicle longitudinal direction.

A console assembly 20 is generally provided between the driver seat 16 and the front passenger seat 18 in the vehicle lateral direction. The console assembly 20 generally extends in the vehicle longitudinal direction extending from the instrument panel 14 ending at or slightly beyond a rear surface of the driver seat 16 and the front passenger seat 18. Further, the console assembly 20 generally extends in the vehicle lateral direction an equal distance outwardly from a vehicle centerline, limited in width by the distance between the driver seat 16 and the front passenger seat 18. The console assembly 20 includes a forward portion 22 and a rearward portion 24. The forward portion 22 being closer to the instrument panel 14 than the rearward portion 24. In some embodiment, the forward portion 22 is coupled to the instrument panel 14.

Disposed within the rearward portion 24 of the console assembly 20 is a storage compartment 26. The storage compartment 26 may be integrated with the console assembly 20. In some embodiments, the storage compartment 26 is integrated with the console assembly 20 and the instrument panel 14. In some other embodiments, the storage compartment 26 may be separated from the console assembly 20, the instrument panel 14, or both.

The console assembly 20 may also include a pair of side panels 28 and a console panel 30. The console panel 30 extends between the storage compartment 26 and the instrument panel 14. The pair of side panels 28 are provided on either side of the console assembly 20 in the vehicle lateral direction. Each of the pair of side panels 28 extends from the forward portion 22 to the rearward portion 24.

Figure 2A:
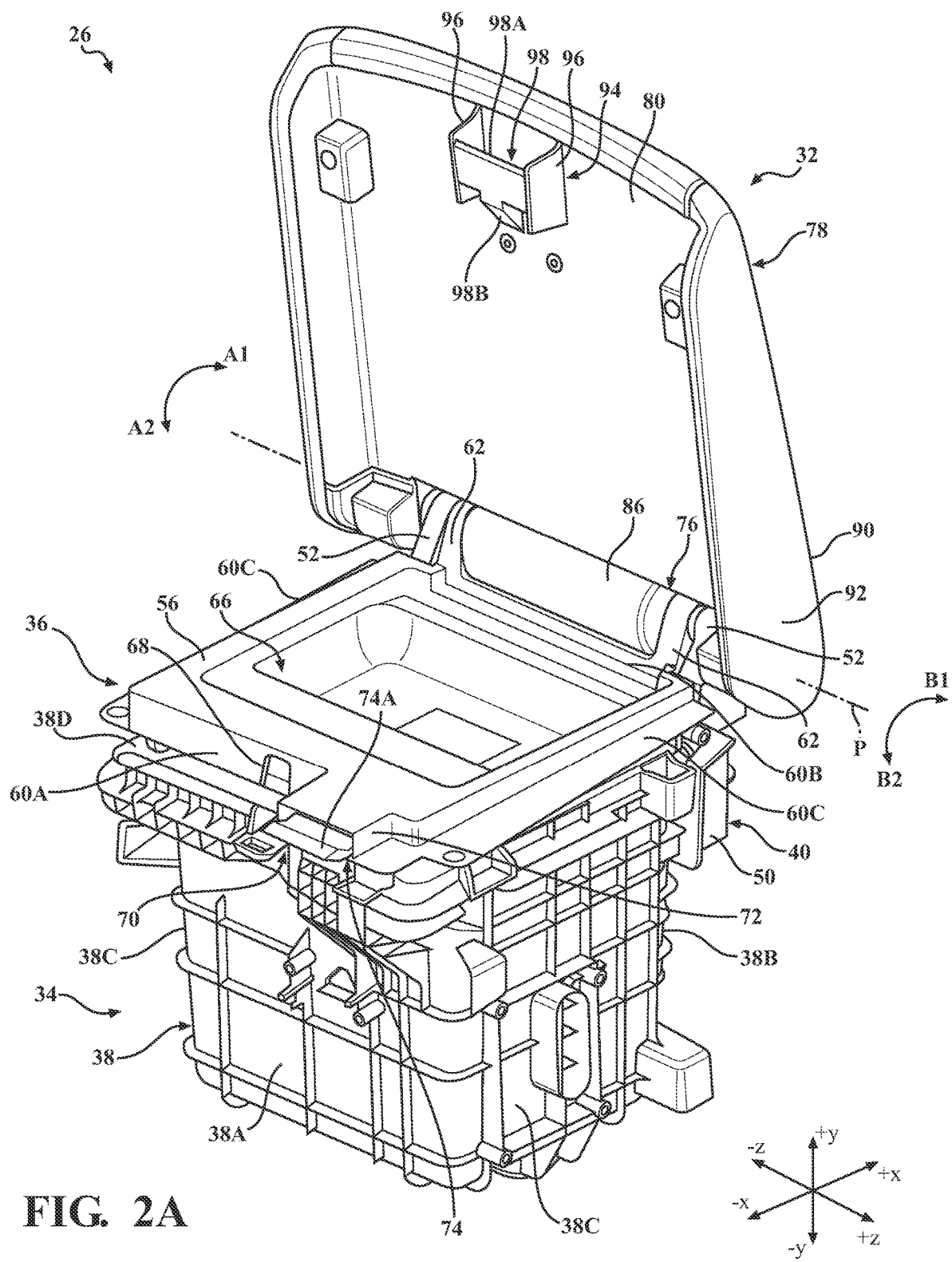
FIG. 2A schematically depicts a partial perspective view of the storage compartment of FIG. 1 in an intermediate state in which a lid is in an open position and a storage tray is in a lowered position, according to one or more embodiments described and illustrated herein.
Figure 2B:
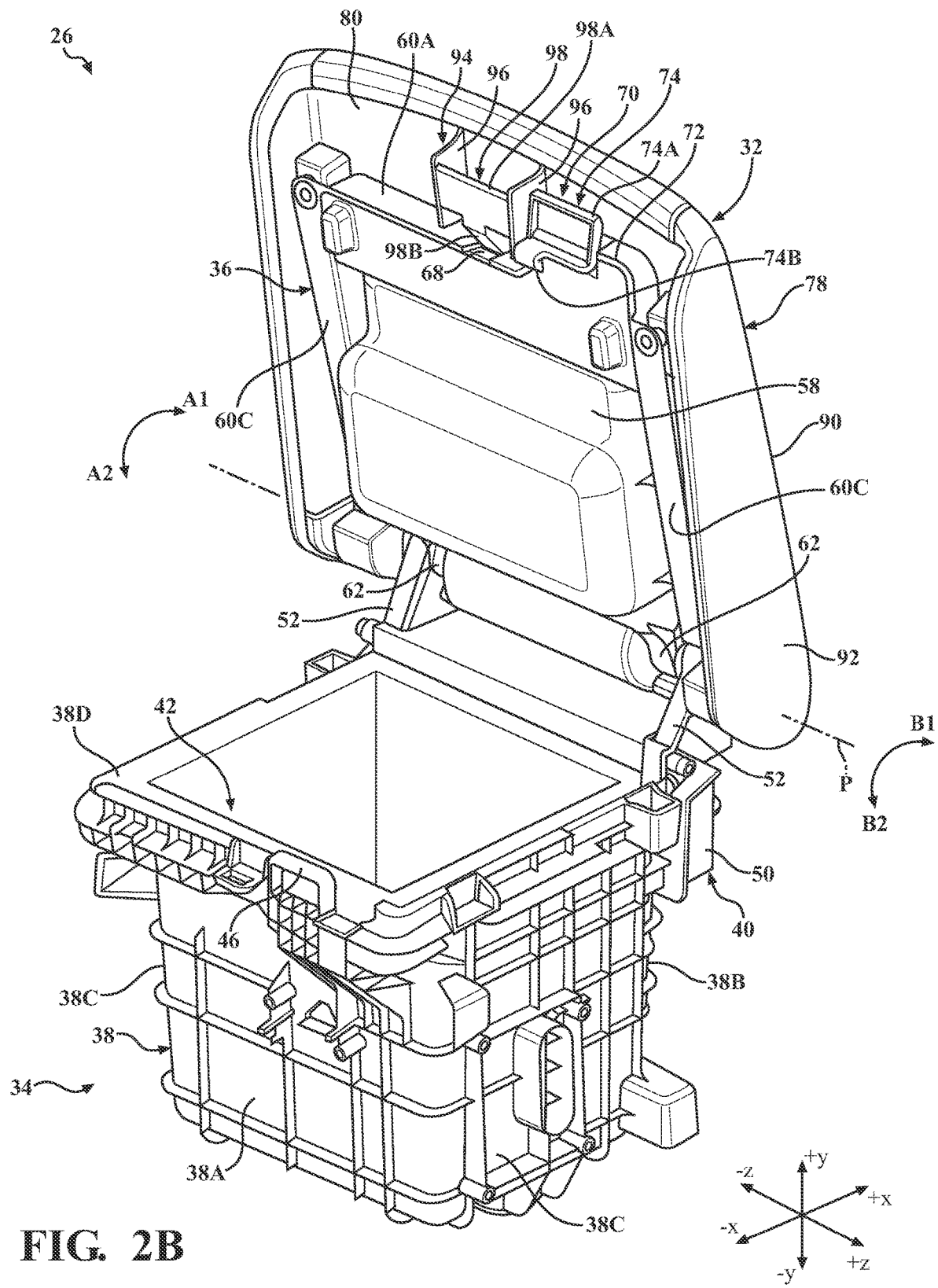
FIG. 2B schematically depicts a partial perspective view of the storage compartment of FIG. 1 in an opened state in which the lid is in the open position and the storage tray is in a raised position, according to one or more embodiments described and illustrated herein.

Referring to FIGS. 2A and 2B, the storage compartment 26 includes a lid 32, a housing 34, and a storage tray 36. The lid 32 is pivotally mounted to the housing 34 about a common pivot axis P. The lid 32 is pivotal about the common pivot axis P between a closed position and an open position. The storage tray 36 is pivotal about the common pivot axis P between a lowered position and a raised position. The lid 32 and the storage tray 36 are pivotal about the common pivot axis P such that the storage compartment 26 is pivotal between a closed state, an intermediate state, and an opened state.

Referring to FIG. 1, the storage compartment 26 is in the closed state. In the closed state, the lid 32 is in the closed position and the storage tray 36 is in the lowered position beneath the lid 32. In the closed position, the lid 32 may act as an armrest for the user and the lid 32 inhibits access to the storage tray 36 as the lid 32 overlays the storage tray 36. In the closed state, the storage tray 36 is inhibited from pivoting from the lowered position to the raised position independent from the lid 32. In the closed state, the lid 32 is permitted to pivot from the closed position to the open position independent from the storage tray 36. The movement of the lid 32 from the closed position to the open position while the storage tray 36 remains in the lowered position switches the storage compartment 26 from the closed state to the intermediate state.

Referring to FIG. 2A, the storage compartment 26 is in the intermediate state. In the intermediate state, the lid 32 is in the open position and the storage tray 36 is in the lowered position. In the open position, the lid 32 is pivoted away from the storage tray 36 thereby permitting access to the storage tray 36. In the intermediate state, the storage tray 36 is permitted to pivot from the lowered positon to the raised position independent from the lid 32. In the intermediate state, the lid 32 is permitted to pivot from the open position to the closed position independent from the storage tray 36. The movement of the storage tray 36 from the lowered position to the raised position switches the storage compartment 26 from the intermediate state to the opened state.

Referring to FIG. 2B, the storage compartment 26 is in the open state. In the open state, the lid 32 is in the open position and the storage tray 36 is in the raised position. In the open state, the storage tray 36 is permitted to pivot from the raised positon to the lowered position independent from the lid 32. In the open state, the lid 32 is inhibited from pivoting from the open position to the closed position independent from the storage tray 36. The movement of the storage tray 36 from the raised position to the lowered position switches the storage compartment 26 from the open state to the intermediate state. The movement of the storage tray 36 from the raised position to the lowered position and the movement of the lid 32 from the open position to the closed positon switches the storage compartment 26 from the opened state to the closed state.

Referring to FIGS. 2A and 2B, the housing 34 includes a housing body 38 and a housing bracket 40 mounted to the housing body 38 such that the housing bracket 40 is fixedly secured to the housing body 38. In some embodiments, the housing body 38 and the housing bracket 40 are formed as separate components that are subsequently connected to fixedly secure the housing bracket 40 to the housing body 38. The housing bracket 40 may be mounted to the housing body 38 by fasteners, rivets, welding, adhesive, ultrasonic welding, or any other technique to fasten two components together. In some embodiments, the housing body 38 and the housing bracket 40 are integrally formed as a one piece monolithic structure. In some embodiments, the housing body 38 and the housing bracket 40 are integrally molded together to form a one piece monolithic structure.

Referring to FIG. 2B, the housing body 38 includes a front wall 38A, an opposite rear wall 38B, and a pair of opposing side walls 38C. The front wall 38A, the rear wall 38B, and the pair of opposing side walls 38C define an interior storage space 42 that is accessible through an opening defined by an upper surface 38D of the housing body 38. The interior storage space 42 is accessible when the storage compartment 26 is in the opened stated such that the lid 32 and the storage tray 36 are pivoted away from the upper surface 38D of the housing body 38 in the open position and the raised position, respectively. In the closed state, the lid 32 and the storage tray 36 cover the opening of the storage space 42 defined by the upper surface 38D of the housing body 38 to inhibit access to the interior storage space 42, as shown in FIG. 1. In the intermediate state, the storage tray 36 covers the upper surface 38D of the housing body 38 to inhibit access to the interior storage space 42, as shown in FIG. 2A.

Referring to FIG. 2B, the housing body 38 may also include a tray receiver 46. In some embodiments, the tray receiver 46 is provided on the front wall 38A in the vehicle longitudinal direction. As will be described in greater detail below, the tray receiver 46 is configured to releasably engage with the storage tray 36 to lock and unlock the storage tray 36 in the lowered position.

Figure 3:
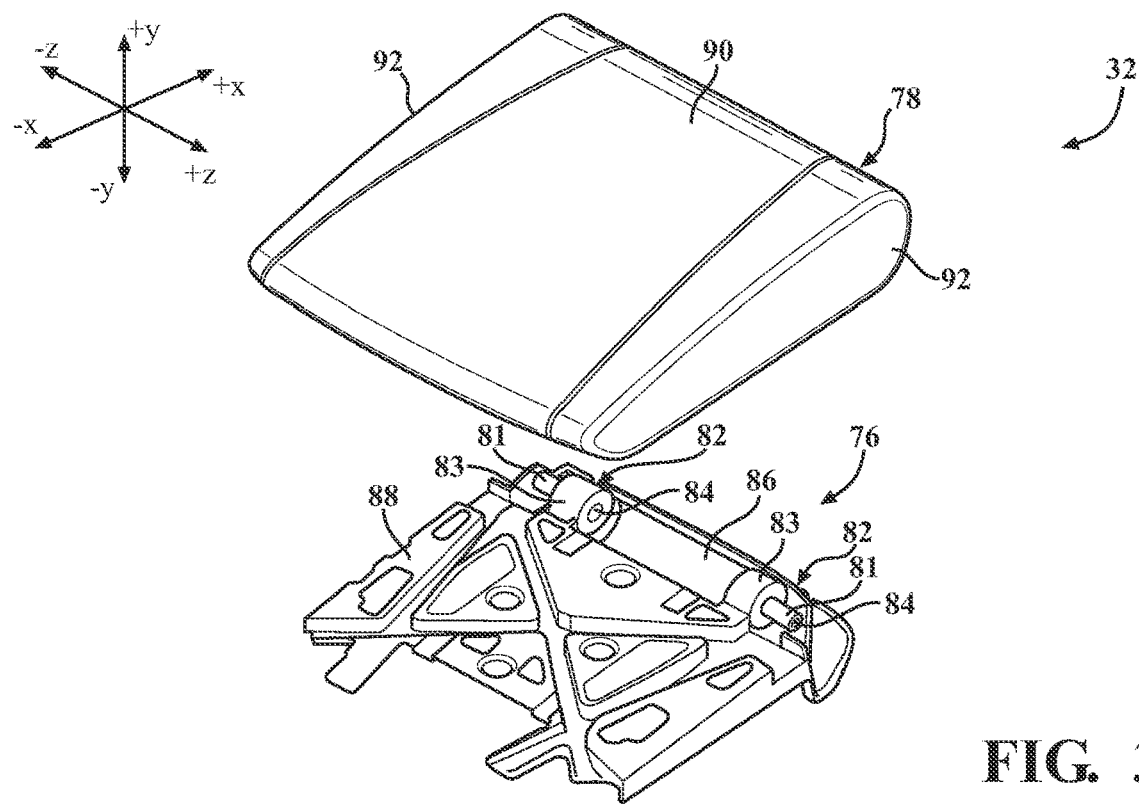
FIG. 3 schematically depicts an exploded view of the lid, the storage tray, and a dual damper assembly of the storage compartment of FIG. 1, according to one or more embodiments described and illustrated herein.
Figure 3:
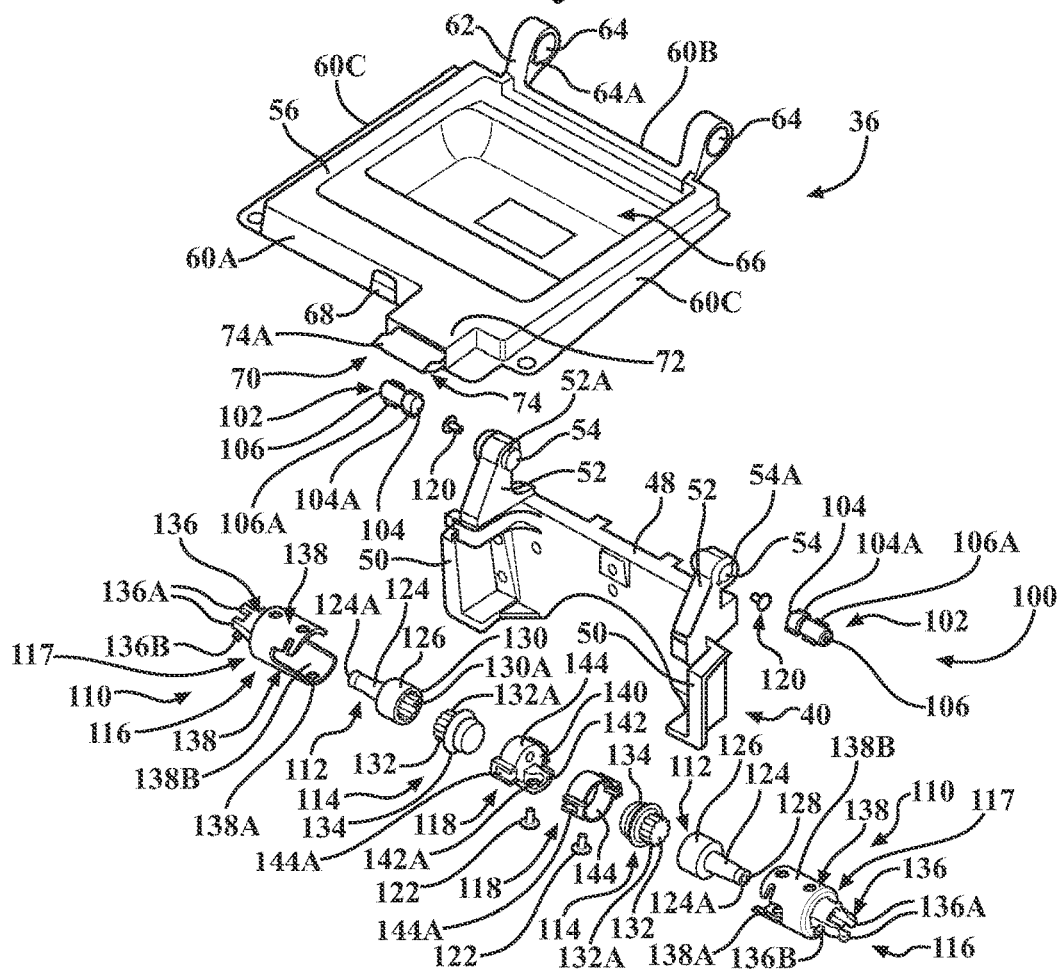

Referring to FIG. 3, the housing bracket 40 includes a base wall 48, a pair of side walls 50, and a pair of arms 52. The base wall 48 is mounted to the rear wall 38B. The pair of side walls 50 extend outwardly from the base wall 48 so as to be positioned on the pair of side walls 38C. The pair of arms 52 extend upwardly from the base wall 48, such that the pair of arms 52 extend upwardly beyond the upper surface 38D of the housing body 38 when the housing bracket 40 is mounted to the housing body 38. Each of the pair of arms 52 includes a bracket opening 54. The bracket openings 54 extend entirely through the pair of arms 52. The pair of arms 52 include an annular collar 52A positioned on an inner side thereof to surround the bracket openings 54. The pair of arms 52 are positioned on the housing body 38 such that the bracket openings 54 are coaxial with the common pivot axis P. Each of the pair of arms 52 include splines 54A that extend into the bracket openings 54.

Referring to FIGS. 2A-3, the storage tray 36 includes an upper surface 56, an opposite lower surface 58, a front edge 60A, an opposite rear edge 60B, a pair of opposing side edges 60C, and a pair of tray arms 62. Each of the pair of tray arms 62 extend upwardly from the upper surface 56. Each of the pair of tray arms 62 includes a tray opening 64. The tray openings 64 extend entirely through the pair of tray arms 62. The pair of tray arms 62 are positioned on the storage tray 36 such that the tray openings 64 are coaxial with the common pivot axis P.

Figure 4:
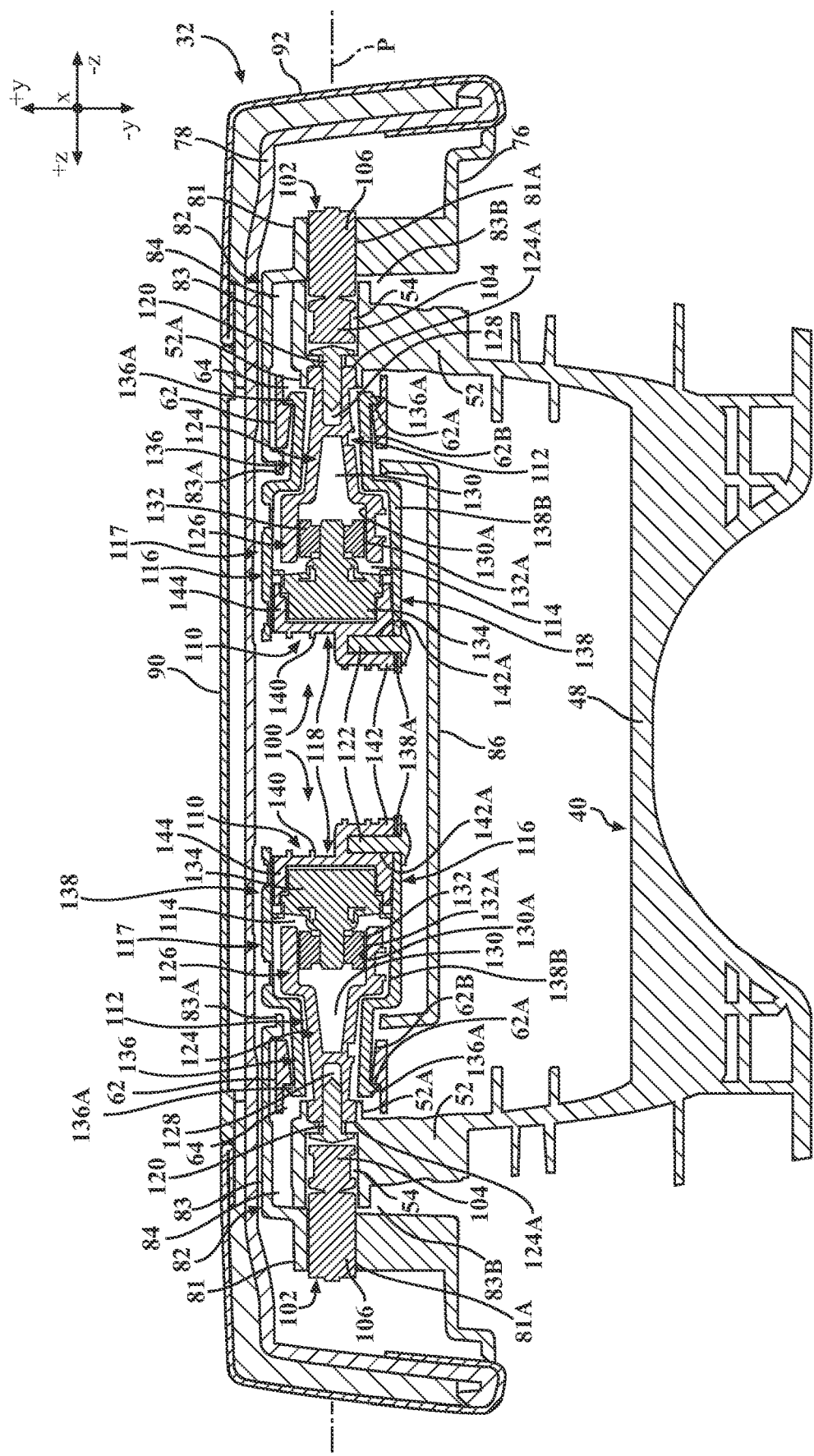
FIG. 4 schematically depicts a partial cross sectional view of the storage compartment taken along the line 4-4 of FIG. 1 in isolation, according to one or more embodiments described and illustrated herein.
Figure 5:
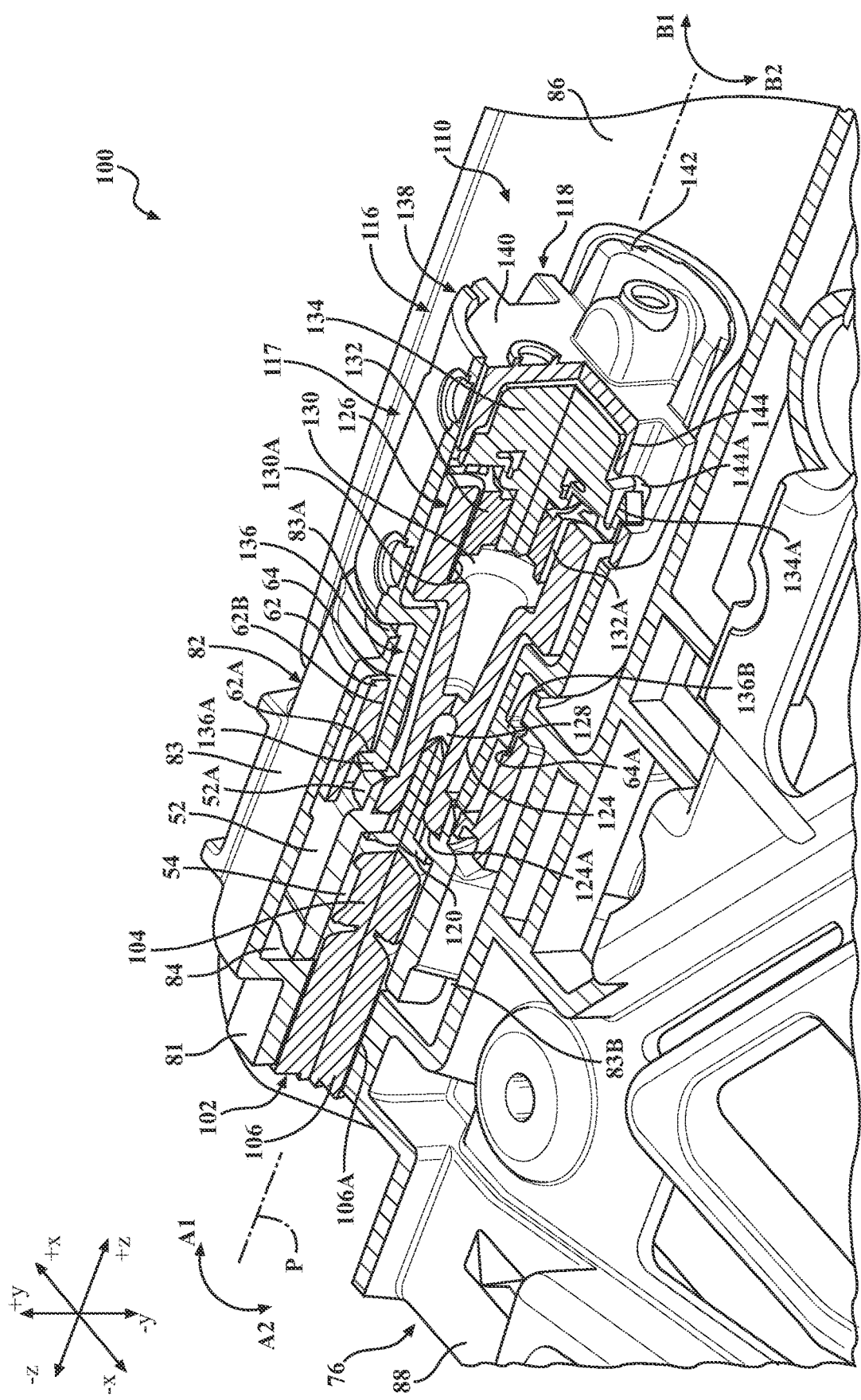
FIG. 5 schematically depicts a partial perspective cross sectional view of the storage compartment, according to one or more embodiments described and illustrated herein.

Referring to FIGS. 4 and 5, the pair of tray arms 62 include a shoulder 62A and an inclined surface 62B extend from the shoulder 62A to an inner side of the tray openings 64. The inclined surface 62B is tapered to narrow a diameter of the tray openings 64 as the inclined surface 62B extends from the inner side of the tray opening 64 to the shoulder 62A. The shoulder 62A is configured as an annular cutout that enlarges the diameter of the tray opening 64 compared to the diameter of the inclined surface 62B. The tray openings 64 also include a recessed notch 64A that is in communication with the tray opening 64 at the inner side of the tray opening 64.

Referring back to FIGS. 2A-3, the upper surface 56 may include a storage cavity 66. The storage cavity 66 is recessed with respect to the remainder of the upper surface 56 to define a tray storage space. The tray storage space on the upper surface 56 is only accessible to the user when the lid 32 is in the open position and the storage tray 36 is in the lowered position.

The storage tray 36 includes lid connector 68 provide on the front edge 60A. As discussed in greater detail below, the lid connector 68 is configured to releasably couple the lid 32 to the storage tray 36. Specifically, the lid connector 68 releasable couples the lid 32 and the storage tray 36 between an engaged state and a disengaged state. In the engaged position, the storage tray 36 is coupled to the lid 32 such the movement of the lid 32 between the closed position and the open position consequently moves the storage tray 36 between the lowered position and the raised position. In the disengaged state, the storage tray 36 is uncoupled from the lid 32 such that the lid 32 and the storage tray 36 are moveable independently.

The storage tray 36 may also include a tray latch mechanism 70 configured to releasably couple the storage tray 36 to the housing body 38. Specifically, the tray latch mechanism 70 includes a mount 72 and a latch 74. The mount 72 extends outwardly from the front edge 60A of the storage tray 36. The latch 74 is pivotally coupled to the mount 72. The latch 74 includes a handle 74A and a hook 74B. The hook 74B is configured to engage the tray receiver 46 formed on the housing body 38. The tray latch mechanism 70 is movable between a locked state and an unlocked state. In the locked state, the hook 74B engages with the tray receiver 46 to lock the storage tray 36 in the lowered position such that the storage tray 36 is inhibited from moving from the lowered position to the raised position. In the unlocked state, the hook 74B is disengaged with the tray receiver 46 to unlock the storage tray 36 in the lowered position such that the storage tray 36 is permitted to move from the lowered position to the raised position. The tray latch mechanism 70 is movable between the locked position and the unlocked position upon actuation of the handle 74A which pivots about the mount 72 to engage and disengage the hook 74B from the tray receiver 46.

Still referring to FIGS. 2A-3, the lid 32 includes a lid frame 76, a lid outer cover 78, and a lid inner cover 80. The lid frame 76 includes a pair of semi-circular barrels 82 defining lid openings 84, a semi-circular chamber 86, and a main frame 88. The lid frame 76 is positioned between the lid outer cover 78 and the lid inner cover 80. The lid outer cover 78 provides an aesthetically pleasing appearance to an outer surface of the lid 32, and the lid inner cover 80 provides an aesthetically pleasing appearance to an inner surface of the lid 32. The lid outer cover 78 includes a base wall 90 and a pair of side walls 92 that extend generally downwardly from the base wall 90. The lid frame 76 is positioned between the pair of side walls 92 of the lid outer cover 78.

Each of the pair of barrels 82 include an outer portion 81 and an inner portion 83. The outer portions 81 are positioned on an outer side of the barrels 82 with respect to the vehicle lateral direction. The inner portions 83 are positioned on an inner side of the barrels 82 with respect to the vehicle lateral direction. The inner portions 83 are formed having a hollow semi-cylindrical shape having an open bottom 83A. The outer portions 81 are formed having a hollow cylindrical shape. The lid openings 84 extend through the barrels 82 from the outer portion 81 to the inner portions 83. The outer portions 81 also include splines 81A that extend inwardly into the lid openings 84, as best shown in FIG. 4.

The lid inner cover 80 includes a lid latch mechanism 94 configured to releasably couple the lid 32 to the housing body 38. Specifically, the lid latch mechanism 94 includes a mount 96 and a latch 98. The mount 96 extends downwardly from the lid inner cover 80. The latch 98 is pivotally coupled to the mount 96. The latch 98 includes a handle 98A and a hook 98B.

The lid latch mechanism 94 is movable between the engaged state, and the disengaged state. In the engaged state, the hook 98B engages with the lid connector 68 to couple the lid 32 to the storage tray 36 such that the lid 32 and the storage tray 36 are inhibited from moving independently from each other. In the engaged state, movement of the lid 32 between the closed position and the open position consequently moves the storage tray 36 between the lowered position and the raised position. In the disengaged state, the hook 98B is disengaged from the lid connector 68 such that the lid 32 is moveable independently from the storage tray 36 and the storage tray 36 is movable independently from the lid 32 when the lid 32 is in the open position.

In some embodiments, the lid latch mechanism 94 moves from the disengaged state to the engaged state upon movement of the storage compartment 26 from the intermediate state to the open state. Specifically, the lid latch mechanism 94 moves from the disengaged state to the engaged state upon movement of the storage tray 36 from the lowered position to the raised position when the lid 32 is in the open position.

In some embodiments, the lid latch mechanism 94 moves from the disengaged state to the engaged state upon movement of the storage compartment 26 from the intermediate state to the closed state. Specifically, the lid latch mechanism 94 moves from the disengaged state to the engaged state upon movement of the lid 32 from the open position to the closed positon when the storage tray 36 is in the lowered position.

In some embodiments, the user moves the storage compartment 26 from the closed state to the intermediate state by actuating the lid latch mechanism 94 to move from the engaged state to the disengaged state. Upon actuating the lid latch mechanism 94 to the disengaged state, the user pivots the lid 32 from the closed position to the open position about the common pivot axis P while the storage tray 36 remains in the locked position by the tray latch mechanism 70.

In some embodiments, the user moves the storage compartment 26 from the intermediate state to the open state by actuating the tray latch mechanism 70 to move from the locked state to the unlocked state and pivots the storage tray 36 from the lowered position to the raised position about the common pivot axis P. In some embodiments, upon movement of the storage compartment 26 from intermediate state to the open state the lid latch mechanism 94 moves from the disengaged state to the engaged state to couple the storage tray 36 to the lid 32.

In some embodiments, the user may move the storage compartment 26 from the open state to the intermediate state by actuating the lid latch mechanism 94 to move from the engaged state to the disengaged state and pivot the storage tray 36 about the common pivot axis P from the raised position to the lowered while the lid 32 remains in the open position. In some embodiments, the user may move the storage compartment 26 from the open state to the closed state by pivoting the lid 32 about the common pivot axis P from the open position to the closed position. As the lid latch mechanism 94 is in the engaged state, the storage tray 36 is coupled to the lid 32 and moves from the raised position to the lowered position upon movement of the lid 32 from the open positon to the closed position. Upon movement of the storage compartment from the open state to the closed state, the tray latch mechanism 70 moves from the unlocked state to the locked state due to the engagement of the hood 74B and the tray receiver.

In some embodiments, the user moves the storage compartment 26 from the closed state to the open state by actuating the tray latch mechanism 70 to move from the locked state the unlocked state, while lid latch mechanism 94 remains in the engaged state, and pivots the lid 32 from the closed position to the open position about the common pivot axis P while the storage tray 36 consequently moves from the lowered position to the raised position about the common pivot axis P.

Referring to FIGS. 3-5, the storage compartment 26 also includes a dual damper assembly 100 that independently damps the movement of the lid 32 and the storage tray 36 about the common pivot axis. The dual damper assembly 100 extends along the common pivot axis P. The dual damper assembly 100 includes a pair of lid dampers 102 and a pair of tray damper assemblies 110. Each of the lid dampers 102 and the tray damper assemblies 110 extend along the common pivot axis P. As the construction and operation of the pair of lid dampers 102 and the pair of tray damper assemblies 110 are mirror imaged and substantially identical, discussion of only one of the pair of lid dampers 102 and only one of the pair of tray damper assemblies 110 will be provided.

The lid damper 102 is a damper that damps the effects of rotation of one end with respect to another end of the lid damper 102. Specifically, the lid damper 102 damps the rotation of the lid 32 with respect to the housing bracket 40 of the housing 34. In some embodiments, the lid damper 102 is an inertia damper such as a rotary damper or a torque insert sold by REELL®. The lid damper 102 includes a fixed housing portion 104 and an opposite pivotal lid portion 106. The lid damper 102 provides a damping force to counteract the rotation of the lid portion 106 with respect to the housing portion 104 about the common pivot axis P.

As discussed in greater detail below, the lid damper 102 is provided such that the lid portion 106 rotates with respect to the housing portion 104 about the common pivot axis P. In some embodiments, the lid damper 102 is a one way damper in which a damping force is only provided exerted when the lid portion 106 rotates with respect to the housing portion 104 in a first direction and no damping force is exerted when the lid portion 106 rotates with respect to the housing portion 104 in a second direction opposite the first direction. In some embodiments, the lid damper 102 is a two way damper in which a damping force is exerted when the lid portion 106 rotates with respect to the housing portion 104 in the first direction and a damping force is exerted when the lid portion 106 rotates with respect to the housing portion 104 in the second direction opposite the first direction. In some embodiments, the first direction is a direction of the arrow A2 and the second direction is a direction of arrow A1 in FIG. 5. In some embodiments, the lid damper 102 only exerts a damping force to counteract the movement of the lid 32 from the open position to the closed position. In some embodiments, the lid damper 102 exerts a damping force to counteract the movement of the lid 32 from the closed position to the open position and exerts a damping force to counteract the movement of the lid 32 from the closed position to the open position.

The lid damper 102 includes splines 104A that extend outwardly from the housing portion 104. The splines 104A of the housing portion 104 engage with corresponding splines 54A formed in the bracket openings 54. The engagement of the splines 104A with the splines 54A fixedly secures the housing portion 104 to the arms 52 of the housing bracket 40 such that the housing portion 104 of the lid damper 102 does not pivot with respect the housing bracket 40 of the housing 34 upon pivoting of the lid portion 106 about the common pivot axis P.

The lid damper 102 includes splines 106A that extend outwardly from the lid portion 106. The splines 106A of the lid portion 106 engage with the corresponding splines 81A formed in the outer portions 81 of the barrel 82. The engagement of the splines 106A with the splines 81A secures the lid portion 106 to the outer portions 81 of the barrels 82 of the lid frame 76 such that the lid portion 106 of the lid damper 102 does pivot with respect the lid frame 76 of the lid 32 upon pivoting of the lid portion 106 about the common pivot axis P.

The tray damper assembly 110 includes an axle 112, a tray damper 114, and a casing 116. The tray damper assembly 110 damps the effects of rotation of the storage tray 36 with respect to the housing bracket 40 of the housing 34 about the common pivot axis. The tray damper assembly 110 is positioned so as to extend along the common pivot axis P.

The axle 112 includes a housing portion 124 and an opposite damper portion 126. The housing portion 124 includes a bore 128 at a distal end 124A. The housing portion 124 has the shape of a tapered shaft that narrows as the housing portion 124 extends from the damper portion 126 to the distal end 124A of the housing portion 124. The damper portion 126 defines a splined cavity 130. The damper portion 126 includes a plurality of splines 130A that extend inwardly into the splined cavity 130. The splined cavity 130A of the damper portion 126 has a generally hollow cylindrical shape. The housing portion 124 has a smaller diameter than the damper portion 126.

The tray damper 114 includes a fixed portion such as a fixed gear 132 and a pivotal portion such as a movable body 134. The tray damper 114 is a damper that damps the effects of rotation of one of the gear 132 and the body 134 with respect to the other of the gear 132 and the body 134. Specifically, the tray damper 114 damps the rotation of the storage tray 36 with respect to the housing bracket 40 of the housing 34. In some embodiments, the tray damper 114 is an inertia damper such as a torque insert or a rotary damper sold by ITW Motion®. The tray damper 114 provides a damping force to counteract the rotation of the body 134 with respect to the gear 132. In some embodiments, the body 134 includes at least one snap tab 134A, as best shown in FIG. 5.

As discussed in greater detail below, the tray damper 114 is provided such that the body 134 rotates with respect to the gear 132 about the common pivot axis P. In some embodiments, the tray damper 114 is a one way damper in which a damping force is only exerted when the body 134 rotates with respect to the gear 132 in a first direction and no damping force is exerted when the body 134 rotates with respect to the gear 132 in a second direction opposite the first direction. In some embodiments, the tray damper 114 is a two way damper in which a damping force is exerted when the body 134 rotates with respect to the gear 132 in the first direction and a damping force is exerted when the body 134 rotates with respect to the gear 132 in the second direction opposite the first direction. In some embodiments, the first direction is a direction of the arrow B2 and the second direction is a direction of arrow B1 in FIG. 5. In some embodiments, the tray damper 114 only exerts a damping force to counteract the movement of the storage tray 36 from the raised position to the lowered position. In some embodiments, the tray damper 114 exerts a damping force to counteract the movement of the storage tray 36 from the raised position to the lowered position and exerts a damping force to counteract the movement of the storage tray 36 from the lowered position to the raised position.

The casing 116 includes a hollow drum portion 117 and a cap 118. The hollow drum portion 117 includes a connection or tray portion 136 and a damper tube portion 138. The tray portion 136 and the damper tube portion 138 are hollow such that a hollow tubular cavity of the tray portion 136 is in communication with a hollow tubular cavity of the damper tube portion 138. The hollow tubular cavity of the tray portion 136 has a diameter that corresponds to an outer diameter of the housing portion 124 of the axle 112. The tray portion 136 of the hollow drum portion 117 includes a pair of snap tabs 136A provided at a distal end of the tray portion 136. The tray portion 136 also includes a tab 136B that extends outwardly in a direction perpendicular to the common pivot axis P. The damper tube portion 138 includes an aperture 138A formed in a side wall 138B that defines the damper tube portion 138. The side wall 138B defines the hollow tubular cavity of the damper tube portion 138. The side wall 138B has a curvature that corresponds to a curvature of the chamber 86 of the lid frame 76. The hollow tubular cavity of the damper tube portion 138 has a diameter that is greater than a diameter of the body 134 of the tray damper 114.

The cap 118 includes a base wall 140, a curved wall 142, and an annular wall 144. The base wall 140 is a generally planar wall from which the annular wall 144 extends. The annular wall 144 defines a cap cavity therein. The annular wall 144 includes at least one opening 144A. The curved wall 142 extends outwardly from the base wall 140 in a direction opposite from the annular wall 144. The curved wall 142 has a curvature that correspond to the curvature of the side wall 138B of the damper tube portion 138. The curved wall 142 includes a bore 142A.

In order to facilitate a better understanding of the dual damper assembly 100, a discussion of the assembly of the dual damper assembly will now be provided. In some embodiments, the housing bracket 40 is mounted to the housing body 38 to form the housing 34. In some embodiments, the housing bracket 40 and the housing body 38 are integrally formed by molding to form the housing 34 as a one piece monolithic structure. The storage tray 36 is then placed on the upper surface 38D of the housing body 38 such that the lower surface 58 of the storage tray 36 faces the upper surface 38D of the housing body 38 and the tray arms 62 of the storage tray 36 are positioned between the arms 52 of the housing bracket 40. The bracket openings 54 of the housing bracket 40 and the tray openings 64 of the tray arms 62 of the storage tray 36 are aligned so as to extend coaxially with the common pivot axis P.

Next the lid frame 76 of the lid 32 is placed over the storage tray 36 such that the arms 52 of the housing bracket 40 and the tray arms 62 of the storage tray 36 are received within the inner portions 83 of the barrels 82 through the open bottoms 83B. Upon placement of the lid frame 76 over the storage tray 36, the lid openings 84 are aligned with the bracket openings 54 of the housing bracket 40 and the tray openings 64 of the tray arms 62 of the storage tray 36 so as to extend coaxially with the common pivot axis P.

The tray damper assembly 110 is assembled by coupling the gear 132 to the splined cavity 130 of the axle 112. The splines 132A of the gear 132 are engaged with the splines 130A of the splined cavity 130 to secure the gear 132 to the axle 112 such that the gear 132 is inhibited from pivoting with respect to the axle 112. The body 134 is coupled cap 118 of the casing 116. The body 134 is inserted into the cap cavity of the cap 118 and coupled thereto by the engagement of the snap tabs 134A of the body 134 to the openings 144A formed on the annular wall 144. The body 134 is coupled to the cap 118 such that the body 134 is inhibited from pivoting with respect to the cap 118.

The axle 112 with the tray damper 114 and the cap 118 attached thereto is inserted into the drum portion 117 of the casing 116. The housing portion 124 of the axle 112 is inserted into the hollow tubular cavity of the damper tube portion 138 and the hollow tubular cavity of the tray portion 136 such that the distal end 124A of the housing portion 124 of the axle 112 extends beyond the snap tabs 136A of the tray portion 136 of the drum portion 117. The insertion of the axle 112 within the drum portion 117 also at least partially inserts the cap 118 into the hollow tubular cavity of the drum portion 117 such that the aperture 138A formed in the side wall 138B aligns with the bore 142A of the curved wall 142. A casing fastener 122 is inserted into the aperture 138A and the bore 142A to fixedly secure the drum portion 117 and the cap 118 together to form the casing 116. As the cap 118 is coupled to the drum portion 117, the body 134 of the tray damper 114 is inhibited from rotating with respect to the drum portion 117 to the connection between the body 134 of the tray damper 114 and the cap 118.

The assembled tray damper assembly 110 is next coupled to the storage compartment 26. The tray damper assembly 110 is placed in the chamber 86 and the housing portion 124 of the axle 112 and the tray portion 136 of the drum portion 117 is inserted into the lid opening 84 of the inner portion 83 of the barrel 82. Upon insertion of the tray damper assembly 110 into the lid opening 84 the snap tabs 136A engage the inclined surface 62B which depresses the snap tabs 136A inwardly until the snap tabs 136A extend beyond the shoulder 62A. The snap tabs 136A engage with the shoulder 62A to inhibited linear movement of the tray damper assembly 110 with respect to the tray openings 64 along the common pivot axis P. The tab 136B of the tray portion 136 of the drum portion 117 is received within the notch 64A of the tray opening 64 such that the casing 116 is inhibited from rotating about the common pivot axis P with respect to the tray arms 62.

The distal end 124A of the housing portion 124 of the axle 112 is received within the collar 52A formed on the arms 52 of the housing bracket 40. An axle fastener 120 extends through the bracket openings 54 and into the bore 128 of the housing portion 124 of the axle 112. The axle fastener 120 fixedly secures the axle 112 to the housing bracket 40 such that the axle 112 is inhibited from rotating with respect to the arms 52 of the housing bracket 40.

Next, the lid damper 102 is coupled to the lid frame 76 and the arms 52 of the housing bracket 40. The housing portion 104 of the lid damper 102 is inserted bracket opening 54 of the arm 52 of the housing bracket 40 along the common pivot axis P. Specifically, the splines 104A of the housing portion 104 of the lid damper 102 engage with the splines 54A formed in the bracket openings 54 to secure the housing portion 104 to the housing bracket 40. The housing portion 104 is fixedly secured to the housing bracket 40 such that the housing portion 104 is inhibited from pivoting with respect to the housing bracket 40 about the common pivot axis P.

The lid portion 106 of the lid damper 102 is inserted into lid opening 84 of the outer portion 81 of the barrel 82 along the common pivot axis P. Specifically, the splines 106A of the lid portion 106 of the lid damper 102 engage with the splines 81A of the outer portion 81 of the barrel 82 to fixedly secure the lid portion 106 to the lid frame 76. The lid portion 106 is fixedly secured to the lid frame 76 such that the lid portion 106 is inhibited from pivoting with respect to the lid frame 76 about the common pivot axis P. Upon coupling of the lid damper 102 to the lid frame 76 and the housing bracket 40 of the housing 34, the lid outer cover 78 is secured to the lid frame 76.

As the housing bracket 40 is mounted to the housing body 38, the housing bracket 40 and the arm 52 of the housing bracket 40 are stationary during movement of the lid 32 and the storage tray 36. The housing portion 104 of the lid damper 102 remains stationary during movement of the lid 32 and the storage tray 36 as the housing portion 104 of the lid damper 102 is fixedly secured to the housing bracket 40. Accordingly, during movement of the lid 32, movement of the storage tray 36, or movement of the lid 32 and the storage tray 36, the housing portion 104 of the lid damper 102 remain stationary and does not pivot about the common pivot axis P.

As the lid portion 106 of the lid damper 102 is fixedly secured to the lid frame 76, the lid 32 is pivotally coupled to the housing 34 by the lid damper 102 about the common pivot axis P. Specifically, the lid 32 is pivotal about the common pivot axis P due to the rotation of the lid portion 106 about the common pivot axis P with respect to the housing portion 104 of the lid damper 102. As such, the lid 32 is pivotal about the common pivot axis P by the lid damper 102. As such, upon movement of the lid 32, the lid portion 106 moves with the movement of the lid 32. However, the lid portion 106 does not pivot about the common pivot axis P upon movement of the storage tray 36 when the lid 32 remains stationary. Specifically, the lid portion 106 does not pivot about the common pivot axis P when the storage tray 36 pivots between the lowered position and the raised position while the lid 32 remains in the open position.

The axle 112 remains stationary during movement of the lid 32, movement of the storage tray 36, and movement of the lid 32 and the storage tray 36, as the axle 112 is fixedly secured to the housing bracket 40 due to the engagement of the axle fastener 120 within the bore 128 and the arm 52. The gear 132 of the tray damper 114 remains stationary during movement of the lid 32, movement of the storage tray 36, and movement of the lid 32 and the storage tray 36, as the gear 132 of the tray damper 114 is fixedly secured to the axle 112 due to the engagement between the splines 132A of the gear 132 and the splines 130A of the splined cavity 130 of the axle 112. As such, the gear 132 does not pivot about the common pivot axis P during movement of the lid 32, movement of the storage tray 36, or movement of the lid 32 and the storage tray 36.

As the tray portion 136 of the drum portion 117 is fixedly secured to the tray arm 62 of the storage tray 36, due to the engagement of the tab 136B within notch 64A, the drum portion 117 moves with the movement of the storage tray 36. As the cap 118 is secured to the damper tube portion 138 of the drum portion 117, due to the engagement of the casing fastener 122 within the aperture 138A and the bore 142A, the cap 118 moves with the movement of the storage tray 36. As the body 134 of the tray damper 114 is secured to the cap 118, due to the engagement of the snap tab 134A within the opening 144A, the body 134 of the tray damper 114 moves with the movement of the storage tray 36.

As the body 134 is fixed to the storage tray 36 through the cap 118 and the drum portion 117 of the casing 116 and the gear 132 is fixedly secured to the housing 34 through the axle 112 and the housing bracket 38, the storage tray 36 is pivotally coupled to the housing 34 by the tray damper 114 and the casing 116. Specifically, the storage tray 36 is pivotal about the common pivot axis P due to the rotation of the body 134 about the common pivot axis P with respect to the gear 132. As such, upon movement of the storage tray 36, the body 134, the cap 118, and the drum portion 117 move with the movement of the storage tray 36. However, the drum portion 117, the cap 118, and the body 134 do not pivot about the common pivot axis P upon movement of the lid 32 when the storage tray 36 remains stationary. Specifically, the drum portion 117, the cap 118, and the body 134 do not pivot about the common pivot axis P when the lid 32 pivots between the closed position and the open position while the storage tray 36 remains in the lowered position.

In order to facilitate a better understanding of the dual damper assembly 100, a discussion of the operation will be provided. Initially, the storage compartment 26 is in the closed state with the lid 32 in the closed position and the storage tray 36 in the lowered position. From the closed state, the user may move the storage compartment 26 into the intermediate state or the open state.

In order to move the storage compartment 26 from the closed state to the intermediate state, the user moves the lid 32 from the closed position to the open position while the storage tray 36 remains in the lowered position. The user actuates the lid latch mechanism 94 to move from the engaged state to the disengaged state. Next, the user lifts the lid 32 to move the lid 32 from the closed position to the open position while the storage tray 36 remains in the lowered position due to the tray latch mechanism 70 remaining in the locked state.

Referring to FIGS. 2A-2B and 4-5, upon movement of the lid 32 from the closed position to the open position, the lid portion 106 pivots about the common pivot axis P in the direction of arrow A1 as the lid portion 106 is fixed to the lid 32. As the housing portion 104 is secured to the housing bracket 40, the housing portion 104 remains stationary while the lid portion 106 rotates about the common pivot axis P to pivot the lid 32 from the closed position to the open position. In some embodiments, the rotation about the common pivot axis P of the lid portion 106 with respect to the housing portion 104 causes the lid damper 102 to exert a damping force against the movement of the lid 32 from the closed position to the open position due to the rotation of the lid portion 106 in the direction of arrow A1 about the common pivot axis P with respect to the housing portion 104.

When the lid latch mechanism 94 is in the disengaged state, the lid 32 moves independently from the storage tray 36 when the lid 32 moves from the closed positon to the open position. Specifically, as the tray damper assembly 110 is not fixedly connected to the lid 32, the storage tray 36 remains in the lowered position while the lid 32 moves from the closed position to the open position.

In order to move the storage compartment 26 from the intermediate state to the closed state, the user moves the lid 32 from the open position to the closed position. Upon movement of the lid 32 from the open position to the closed position, the lid portion 106 pivots about the common pivot axis P in the direction of arrow A2 as the lid portion 106 is fixed to the lid 32. As the housing portion 104 is secured to the housing bracket 40, the housing portion 104 remains stationary while the lid portion 106 pivots about the common pivot axis P to pivot the lid 32 from the open position to the closed position. In some embodiments, the rotation about the common pivot axis P of the lid portion 106 with respect to the housing portion 104 causes the lid damper 102 to exert a damping force against the movement of the lid 32 from the open position to the closed position due to the rotation of the lid portion 106 in the direction of arrow A2 about the common pivot axis P with respect to the housing portion 104.

As the storage compartment 26 is in the intermediate state, the lid 32 moves independently from the storage tray 36 when the lid 32 moves from the open positon to the closed position. Specifically, as the tray damping assembly 110 is not fixedly connected to the lid 32, the storage tray 36 remains in the lowered position while the lid 32 moves from the open position to the closed position. Upon movement of the lid 32 from the open position to the closed position, the lid latch mechanism 94 engages with the lid connector 68 to move from the disengaged state to the engaged state to couple the lid 32 to the storage tray 36 in the closed state.

In order to move the storage compartment 26 from the closed state to the open state, the user moves the lid 32 from the closed position to the open position and moves the storage tray 36 from the lowered position to the raised position. The user actuates the tray latch mechanism 70 to move from the locked state to the unlocked state. Next, the user lifts the lid 32 to move the lid 32 from the closed position to the open position. As the storage tray 36 is connected to the lid 32 due to the engagement of the hook 98B with the lid connector 68, the movement of the lid 32 from the closed position to the open position consequently moves the storage tray 36 from the lowered position to the raised position.

Upon movement of the lid 32 from the closed position to the open position, the lid portion 106 pivots about the common pivot axis P in the direction of arrow A1 as the lid portion 106 is fixed to the lid 32. As the housing portion 104 is secured to the housing bracket 40, the housing portion 104 remains stationary while the lid portion 106 rotates about the common pivot axis P to pivot the lid 32 from the closed position to the open position. In some embodiments, the rotation about the common pivot axis P of the lid portion 106 with respect to the housing portion 104 causes the lid damper 102 to exert a damping force against the movement of the lid 32 from the closed position to the open position due to the rotation of the lid portion 106 in the direction of arrow A1 about the common pivot axis P with respect to the housing portion 104.

Upon movement of the storage tray 36 from the lowered position to the raised position, the body 134 pivots about the common pivot axis P in the direction of arrow B1 as the body 134 is fixedly secured to the casing 116 which is fixedly secured to the storage tray 36. As the gear 132 is fixedly secured to the housing bracket 40 through the axle 112, the gear 132 remains stationary while the body 134 rotates about the common pivot axis P in the direction of arrow B1 to the pivot the storage tray 36 from the lowered position to the raised position. In some embodiments, the rotation about the common pivot axis P of the body 134 with respect to the gear 132 causes the tray damper 114 to exert a damping force against the movement of the storage tray 36 from the lowered position to the raised position due to the rotation of the body 134 in the direction of arrow B1 about the common pivot axis P with respect to the gear 132.

In order to move the storage compartment 26 from the open state to the closed state, the user moves the lid 32 from the open position to the closed position and moves the storage tray 36 from the raised position to the lowered position. The user lowers the lid 32 to move the lid 32 from the open position to the closed position. As the lid latch mechanism 94 is in the engaged state when the storage compartment 26 is in the open state, due to the connection of the hook 98B with the lid connector 68, the movement of the lid 32 from the open position to the closed position consequently moves the storage tray 36 from the raised position to the lowered position.

Upon movement of the lid 32 from the open position to the closed position, the lid portion 106 pivots about the common pivot axis P in the direction of arrow A2 as the lid portion 106 is fixed to the lid 32. As the housing portion 104 is secured to the housing bracket 40, the housing portion 104 remains stationary while the lid portion 106 rotates about the common pivot axis P to pivot the lid 32 from the open position to the closed position. In some embodiments, the rotation about the common pivot axis P of the lid portion 106 with respect to the housing portion 104 causes the lid damper 102 to exert a damping force against the movement of the lid 32 from the closed position to the open position due to the rotation of the lid portion 106 in the direction of arrow A2 about the common pivot axis P with respect to the housing portion 104. Upon movement of the lid 32 from the open position to the closed position, the lid latch mechanism 94 engages with the lid connector 68 to move from the disengaged state to the engaged locked state to couple lid 32 to the housing 34 in the closed position through the engagement of the tray latch mechanism 70 with the tray receiver 46.

Upon movement of the storage tray 36 from the raised position to the lowered position, the body 134 pivots about the common pivot axis P in the direction of arrow B2 as the body 134 is fixed to the casing 116 which is fixed to the storage tray 36. As the gear 132 is secured to the housing bracket 40 through the axle 112, the gear 132 remains stationary while the body 134 rotates about the common pivot axis P to the pivot the storage tray 36 from the lowered position to the raised position. In some embodiments, the rotation about the common pivot axis P of the body 143 with respect to the gear 132 causes the tray damper 114 to exert a damping force against the movement of the storage tray 36 from the raised position to the lowered position due to the rotation of the body 134 in the direction of arrow B2 about the common pivot axis P with respect to the gear 132. Upon movement of the storage tray 36 from the raised position to the lowered position, the tray latch mechanism 70 moves from the unlocked state to the locked state due to the engagement of the hook 74B with the tray receiver 46 to couple the storage tray 36 to the housing 34 in the lowered position.

In order to move the storage compartment 26 from the intermediate state to the open state, the user moves the storage tray 36 from the lowered position to the raised position while the lid 32 is in the open position. The user actuates the tray latch mechanism 70 to move from the locked state to the unlocked state. Next, the user raises the storage tray 36 to move the storage tray 36 from the lowered position to the raised position. As lid latch mechanism 94 is in the disengaged state in the intermediate state, the storage tray 36 moves independently from the lid 32.

Upon movement of the storage tray 36 from the lowered position to the raised position, the body 134 pivots about the common pivot axis P in the direction of arrow B1 as the body 134 is fixed to the casing 116 which is fixed to the storage tray 36. As the gear 132 is secured to the housing bracket 40 through the axle 112, the gear 132 remains stationary while the body 134 rotates about the common pivot axis P to the pivot the storage tray 36 from the lowered position to the raised position. In some embodiments, the rotation about the common pivot axis P of the body 134 with respect to the gear 132 causes the tray damper 114 to exert a damping force against the movement of the storage tray 36 from the lowered position to the raised position due to the rotation of the body 134 in the direction of arrow B1 about the common pivot axis P with respect to the gear 132. Upon movement of the storage tray 36 from the lowered position to the raised position, the lid latch mechanism 94 engages with the lid connector 68 to move from the disengaged state to the engaged state to couple lid 32 to the storage tray 36 in the open state.

In order to move the storage compartment 26 from the open state to the intermediate state, the user moves the storage tray 36 from the raised position to the lowered position while the lid 32 remains in the open position. Initially, the user actuates the lid latch mechanism 94 to move from the engaged state to the disengaged state. Next, the user lowers the storage tray 36 from the raised position to the lowered position while the lid 32 remains in the open position. As the storage tray 36 is in the disengaged state, the storage tray 36 moves independently from the lid 32. Upon movement of the storage tray 36 from the raised position to the lowered position, the tray latch mechanism 70 engages with the tray receiver 46 to move from the unlocked state to the locked state to lock the storage tray 36 in the lowered position.

Upon movement of the storage tray 36 from the raised position to the lowered position, the body 134 pivots about the common pivot axis P in the direction of arrow B2 as the body 134 is fixed to the casing 116 which is fixed to the storage tray 36. As the gear 132 is secured to the housing bracket 40 through the axle 112, the gear 132 remains stationary while the body 134 rotates about the common pivot axis P to the pivot the storage tray 36 from the raised position to the lowered position. In some embodiments, the rotation about the common pivot axis P of the body 143 with respect to the gear 132 causes the tray damper 114 to exert a damping force against the movement of the storage tray 36 from the raised position to the lowered position due to the rotation of the body 134 in the direction of arrow B2 about the common pivot axis P with respect to the gear 132.

In some embodiments, the lid damper 102 is a two way damper that exerts a damping force when the lid 32 is pivoted about the common pivot axis P from the closed position to the open position and when the lid 32 is pivoted about the common pivot axis P from the open position to the closed position. In some embodiments, the lid damper 102 is a one way damper that only exerts a damping force when the lid 32 is pivoted about the common pivot axis P from the open position to the closed position to prevent the lid 32 from slamming closed.

In some embodiments, the tray damper 114 is a two way damper that exerts a damping force when the storage tray 36 is pivoted about the common pivot axis P from the lowered position to the raised position and when the storage tray 36 is pivoted about the common pivot axis from the raised position to the lowered position. In some embodiments, the tray damper 114 is a one way damper that only exerts a damping force when the storage tray 36 is pivoted about the common pivot axis P from the raised position to the lowered position to prevent the storage tray 36 from slamming closed.

In some embodiments, the lid damper 102 is a two way damper and the tray damper 114 is a two way damper. In some embodiments, the lid damper 102 is a two way damper and the tray damper 114 is a one way damper. In the some embodiments, the lid damper 102 is a one way damper and the tray damper 114 is a two way damper. In some embodiments, the lid damper 102 is a one way damper and the tray damper 114 is a one way damper.

It is appreciated that the storage compartment 26 is not limited to a position between the driver seat 16 and the passenger seat 18. In some embodiments, the storage compartment 26 may be provided in other areas of the passenger compartment 12.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A storage compartment comprising:
   a housing;
   a lid;
   a pair of lid dampers that pivotally couple the lid to the housing about a pivot axis such that the lid is moveable between an open position and closed position;
   a storage tray; and
   a pair of tray dampers that pivotally couple the storage tray to the housing about the pivot axis such that when the lid is in the open position the storage tray is moveable between a lowered position and a raised position independent of the lid,
   wherein each of the pair of lid dampers and the pair of tray dampers are spaced apart along the pivot axis.

2. The storage compartment of claim 1, wherein each of the pair of lid dampers are is configured to exert a damping force against at least one of the movement of the lid from the closed position to the open position and the movement of the lid from the open position to the closed positon, and
   wherein each of the pair of tray dampers are is configured to exert a damping force against at least one of the movement of the storage tray from the lowered position to the raised position and the movement of the storage tray from the raised position to the lowered positon.

3. The storage compartment of claim 2, further comprising:
   a pair of axles; and
   a pair of casings,
   wherein each of the pair of tray dampers includes a fixed portion and pivotal portion, the pivotal portion being pivotable about the pivot axis with respect to the fixed portion, each one of the pair of axles secures the housing to the fixed portion of the pair of tray dampers, each one of the pair of casings secures the pivotal portion of the pair of tray dampers to the storage tray such that the storage tray is pivotal about the pivot axis between the lowered position and the raised position.

4. The storage compartment of claim 3, wherein each of the pair of axles includes a housing portion and an damper portion, and each of the pair of casings includes a damper tube portion and an tray portion, the housing portion of each of the pair of axles is fixed to the housing, the damper portion of each of the pair of axles is fixed to the fixed portion of each of the pair of tray dampers, the pivotal portion of each of the pair of tray dampers is fixed to the damper tube portion of each of the pair of casings, and the tray portion of each of the pair of casings is fixed to the storage tray.

5. The storage compartment of claim 4, wherein upon movement of the storage tray between the lowered position and the raised position, each of the pair of casings and the pivotal portion of each of the pair of tray dampers pivot with the storage tray, and each of the axles and the fixed portion of each of the pair of tray dampers remain stationary.

6. The storage compartment of claim 5, wherein each of the pair of casings defines a hollow tubular cavity that extends coaxially with the pivot axis, and at least a portion of each of the pair of axles being received within the hollow tubular cavity of each of the pair of casings.

7. The storage compartment of claim 3, wherein each of the pair of lid dampers includes a fixed housing portion and a pivotal lid portion pivotable about the pivot axis with respect to the fixed housing portion, the fixed housing portion of each of the pair of lid dampers being fixed to the housing and the pivotal lid portion of each of the pair of lid dampers being fixed to the lid such that the lid is pivotal about the pivot axis between the open position and the closed position.

8. The storage compartment of claim 7, wherein upon movement of the lid between the open position and the closed position the pivotal lid portion of each of the pair of lid dampers moves with the lid and the fixed housing portion of each of the pair of lid dampers remains stationary.

9. The storage compartment of claim 8, wherein the housing defines a storage space, and the storage tray defines a tray storage space,
wherein when the lid is in the closed position, access to the storage space and the tray storage space are inhibited, and
wherein when the lid is in the open position and the storage tray is in the lowered position, access to the tray storage space is permitted.

10. A console assembly for a vehicle, the console assembly comprising:
a housing;
a lid;
a pair of lid dampers that pivotally couple the lid to the housing about a pivot axis such that the lid is moveable between an open position and closed position;
a storage tray; and
a pair of tray dampers that pivotally couple the storage tray to the housing about the pivot axis such that when the lid is in the open position the storage tray is moveable between a lowered position and a raised position independent of the lid,
wherein each of the pair of lid dampers and the pair of tray dampers are spaced apart along the pivot axis.

11. The console assembly of claim 10, wherein each of the pair of lid dampers are is configured to exert a damping force against at least one of the movement of the lid from the closed position to the open position and the movement of the lid from the open position to the closed positon, and
wherein each of the pair of tray dampers are configured to exert a damping force against at least one of the movement of the storage tray from the lowered position to the raised position and the movement of the storage tray from the raised position to the lowered positon.

12. The console assembly of claim 11 further comprising:
a pair of axles; and
a pair of casings,
wherein each of the pair of tray dampers includes a fixed portion and pivotal portion, the pivotal portion being pivotable about the pivot axis with respect to the fixed portion, each one of the pair of axles secures the housing to the fixed portion of the pair of tray dampers, each one of the pair of casings secures the pivotal portion of the pair of tray dampers to the storage tray such that the storage tray is pivotal about the pivot axis between the lowered position and the raised position.

13. The console assembly of claim 12, wherein each of the pair of axles includes a housing portion and an damper portion, and each of the pair of casings includes a damper tube portion and an tray portion, the housing portion of each of the pair of axles is fixed to the housing, the damper portion of each of the pair of axles is fixed to the fixed portion of each of the pair of tray dampers, the pivotal portion of each of the pair of tray dampers is fixed to the damper tube portion of each of the pair of casings, and the tray portion of each of the pair of casings is fixed to the storage tray.

14. The console assembly of claim 13, wherein upon movement of the storage tray between the lowered position and the raised position, each of the pair of casings and the pivotal portion of each of the pair of tray dampers pivot with the storage tray, and each of the axles and the fixed portion of each of the pair of tray dampers remain stationary.

15. The console assembly of claim 14, wherein each of the pair of casings defines a hollow tubular cavity that extends coaxially with the pivot axis, and at least a portion of each of the pair of axles being received within the hollow tubular cavity of each of the pair of casings.

16. The console assembly of claim 12, wherein each of the pair of lid dampers includes a fixed housing portion and a pivotal lid portion pivotable about the pivot axis with respect to the fixed housing portion, the fixed housing portion of each of the pair of lid dampers being fixed to the housing and the pivotal lid portion of each of the pair of lid dampers being fixed to the lid such that the lid is pivotal about the pivot axis between the open position and the closed position.

17. The console assembly of claim 16, wherein upon movement of the lid between the open position and the closed position the pivotal lid portion of each of the pair of lid dampers moves with the lid and the fixed housing portion of each of the pair of lid dampers remains stationary.

18. The console assembly of claim 17, wherein the housing defines a storage space, and the storage tray defines a tray storage space,
wherein when the lid is in the closed position, access to the storage space and the tray storage space are inhibited, and
wherein when the lid is in the open position and the storage tray is in the lowered position, access to the tray storage space is permitted.

19. A vehicle comprising:
a passenger compartment;
a storage compartment provided in the passenger compartment, the storage compartment comprising:
a housing;
a lid;
a pair of lid dampers that pivotally couple the lid to the housing about a pivot axis such that the lid is moveable between an open position and closed position;
a storage tray; and
a pair of tray dampers that pivotally couple the storage tray to the housing about the pivot axis such that when the lid is in the open position the storage tray is moveable between a lowered position and a raised position independent of the lid,
wherein each of the pair of lid dampers and the pair of tray dampers are spaced apart along the pivot axis.

20. The vehicle of claim 19, wherein each of the pair of lid dampers are configured to exert a damping force against at least one of the movement of the lid from the closed position to the open position and the movement of the lid from the open position to the closed positon, and wherein each of the pair of tray dampers are configured to exert a damping force against at least one of the movement of the storage tray from the lowered position to the raised position and the movement of the storage tray from the raised position to the lowered positon.

* * * * *